United States Patent [19]

Spyrou et al.

[11] 3,718,854
[45] Feb. 27, 1973

[54] FREQUENCY CONVERTER CIRCUIT WITH MULTIVIBRATOR CONTROL

[75] Inventors: Constantine A. Spyrou, Clifton Heights, Pa.; George P. Klein, Haddonfield, N.J.

[73] Assignee: Electrospace Corporation, Westbury, N.Y.

[22] Filed: Oct. 29, 1971

[21] Appl. No.: 193,823

[52] U.S. Cl. .................... 321/69 R, 307/220, 328/25
[51] Int. Cl. ............................................... H02m 5/30
[58] Field of Search ........... 307/220; 321/69; 328/25

[56] References Cited

UNITED STATES PATENTS 3,579,086   5/1971   Lebenbaum, Jr. ................. 321/69 R
3,246,231   4/1966   Clarke ................................ 321/69 R

OTHER PUBLICATIONS

G. E. Application Note No. 200.35, "Triac Control for AC Power," pp. 3, 4, May, 1964.

Primary Examiner—William M. Shoop, Jr.
Attorney—Albert F. Kronman

[57] ABSTRACT

A non-resonant circuit using the switching functions of a pair of controlled double rectifiers and the dividing characteristic of a bistable multivibrator. A single sixty hertz transformer is used to provide all the power necessary for operating the device. Bidirectional gates, or triacs, are controlled by the multivibrator to pass a full cycle of current from one side of a secondary winding and then switch to a full cycle from the other side of the winding. The result is an alternating current of half the frequency of the supply current.

6 Claims, 2 Drawing Figures

INVENTORS
CONSTANTIN A. SPYROU
GEORGE F. KLEIN

ATTORNEY

FREQUENCY CONVERTER CIRCUIT WITH MULTIVIBRATOR CONTROL

BACKGROUND OF THE INVENTION

The present invention is designed to be used to furnish current for ringing signals in a telephone system, but it can be applied to many other electrical uses. A reduction of frequency can be accomplished in many ways. A motor generator is an obvious means, but it has moving parts and is heavy. A vibrator can also be used, employing a resonant reed with magnetic driving means and contacts to produce a square wave output. A resonant inductor, using the saturation of core material is still another way of obtaining a reduced frequency, but the components are expensive and bulky.

The present invention has no moving parts. It does not require expensive inductors, saturable cores, or large capacitors. It uses semi-conductor switching circuits which require a minimum of service.

One of the features of the present invention is the use of semi-conductor switches using no moving parts.

Another feature of the invention is the use of a digital bistable dividing circuit which reduces the frequency by one half without the use of any inductors.

Other features and additional details will be disclosed in the following description taken in connection with the accompanying drawings.

DESCRIPTION OF THE PREFERRED EMBODIMENT

Figure 1:
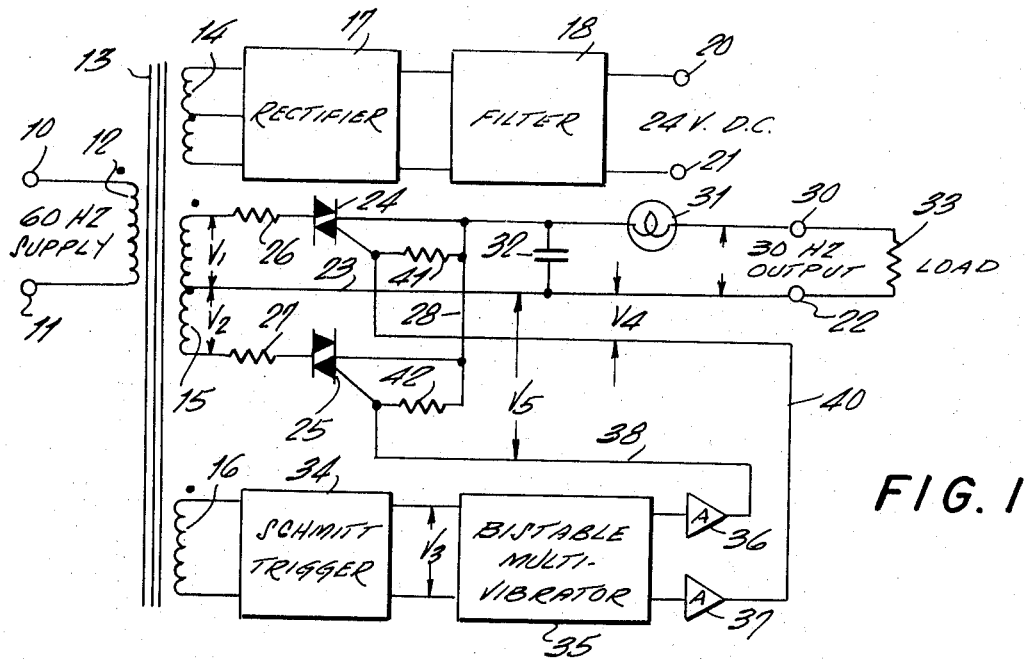
FIG. 1 is a schematic diagram of connections showing the entire circuit.

The frequency converter receives all of its power from the usual 60 hertz supply line which is to be connected to terminals 10–11 and a primary transformer winding 12. The primary winding 12 is on a core 13 which also holds secondary windings 14, 15, and 16. Secondary winding 14 is connected to a rectifier circuit 17 which produces direct current pulses. A filter circuit 18 removes most of the alternating components and noise and applies 24 volts, direct current, to output terminals 20, 21. This power is used to power the other circuits.

The second secondary winding 15 is tapped at its midpoint and one of the output terminals 22 is connected to this point by a conductor 23 which may be grounded. The end terminals of winding 15 are connected respectively to biconductive switches 24, 25, in series with resistors 26, 27. The other sides of switches 24, 25 (sometimes termed "triacs") are connected together by conductor 28 and also to the other output terminal 30 in series with a tungsten lamp 31. Lamp 31 is not a necessary component in the circuit but has been added to protect semi-conductor switches in case the output terminals 22, 30 are short circuited. A capacitor 32 may be added to absorb the 60 hertz frequency components, noise, and switching transients. Terminals 22, 30 are connected to a load 33 which may be a telephone ringing circuit.

The third secondary winding 16 is connected to a Schmitt trigger circuit 34 which is made conductive only when the amplitude of the input voltage exceeds a predetermined value. The output is a square topped wave. Schmitt trigger circuits are well known in the art, two practical circuits being shown and described in Transistor Manual, page 200, a book published in 1964 by the General Electric Co. The square wave from the Schmitt trigger circuit 34 is applied to a bistable multivibrator circuit 35 having at least two semi-conductor transistors. Each square wave shifts conductance from one transistor to the other, thereby producing two output waves, one applied to a similar amplifier 37. Bistable multivibrators are old in the art and are described in detail in "Principles of Transistor Circuits," page 209, a book published by the Hayden Book Co. of New York, 1965.

The output pulses from amplifiers 36 and 37 are applied respectively to conductors 38 and 40 and to the firing electrodes of triacs 24, 25 to make them conductive in a sequential manner, controlled by the 60 hertz waves from winding 16. Resistors 41 and 42 are connected between the firing electrodes and the common conductor 28 to prevent the buildup of any static charges on the triacs.

Figure 2:
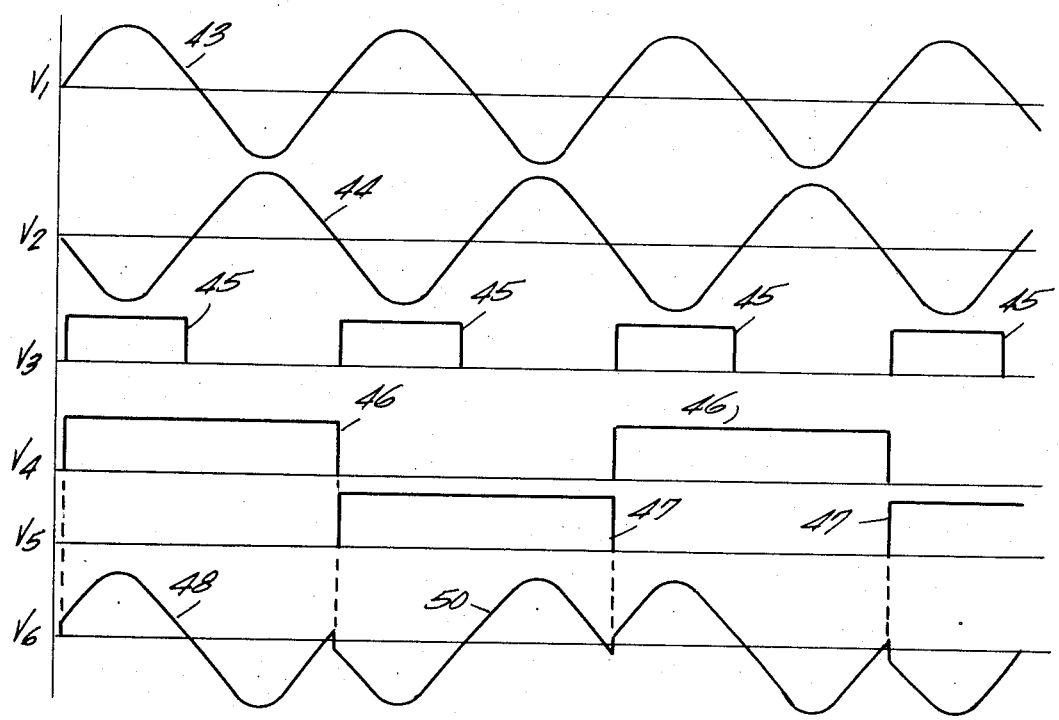
FIG. 2 is a graph showing some of the wave forms in the circuit.

The operation of the circuit will now be described using the wave forms of FIG. 2 in conjunction with the wiring diagram of FIG. 1. The first wave form $V_1$ is a sine wave 43 as it appears across the first part of the second secondary winding. The graph of this wave is the same as the graph of the wave received at the input terminals 10, 11. The second wave form $V_2$ is also a sine wave 44 and is the same as the wave 43 except that the polarity has been reversed. The wave applied to the Schmitt trigger circuit 34 from winding 16 is the same as sine wave 43 and produces a series of square topped pulses 45 ($V_3$). These pulses 45 when applied to the bistable multi-vibrator 35 produce a first series of pulses 46 ($V_4$) applied through amplifier 37 to the firing electrode of triac 24 and a second series of pulses 47 ($V_5$) applied through amplifier 36 to the firing electrode of triac 25.

When the positive going pulse 46 is applied to triac 24, a complete wave 48, including both positive and negative halves, passes through the triac and is sent through lamp 31 to terminal 30 and load 33. When the positive going pulse 47 is applied to triac 25 another complete wave 50, including both positive and negative halves, is sent to the load 33 by way of conductor 28, lamp 31, and terminal 30. It is noted that the last half of wave 48 is negative going as is the first of wave 50. Also, all successive waves repeat this pattern, alternating positive and negative and producing an impure 30 hertz wave. A rough measurement of the voltage values shows that an original wave of 60 hertz at 100 volts produces 60 volts of 30 hertz, 35 volts of 90 hertz, and 5 volts of 150 hertz and higher harmonics. Appropriate filtering means, such as a notch filter, can be used in the output circuit if desired.

Having thus fully described the invention, what is claimed as new and desired to be secured by Letters Patent of the United States, is:

1. A frequency converter for dividing the frequency of a source of alternating current power by two, comprising: a coupling circuit between the power source and two secondary power sources, said secondary sources differing in phase by 180°; a bidirectional gate in series with each of said secondary power sources, said gates connected to a common output terminal for combining the current outputs of both gates; a bistable multivibrator circuit having its control circuit coupled to the power source for generating two trains of square topped waves, each train having a frequency equal to one half the power source frequency; a first coupling circuit for applying a first square topped wave to the firing electrode of the first gate to make it conductive for a complete cycle of the source every other cycle; a second coupling circuit for applying a second square topped wave to the firing electrode of the second square topped wave to the firing electrode of the second gate to make it conductive for a complete cycle during the time the first gate is non-conductive; and a voltage sensitive coupling circuit connected between the power source and the bistable multivibrator for controlling the output to generate said trains.

2. A frequency converter according to claim 1 wherein said coupling circuit between the power source and the two secondary power sources is a transformer.

3. A frequency converter according to claim 2 wherein said two secondary power sources are secondary windings on the transformer having a common winding terminal which is connected to the other output terminal of the converter.

4. A frequency converter according to claim 1 wherein said first and second coupling circuits for applying the two square topped waves to electrodes firing electrodes are each connected in series with a buffer amplifier.

5. A frequency converter according to claim 1 wherein a resistor is connected in series between each of the bidirectional gates and the secondary power sources.

6. A frequency converter according to claim 3 wherein said secondary windings provide the bidirectional gates with alternating current voltages that are 180° out of phase with each other.

* * * * *